US 12,535,382 B2

(12) United States Patent
Innes et al.

(10) Patent No.: US 12,535,382 B2
(45) Date of Patent: Jan. 27, 2026

(54) SENSOR AND METHOD FOR PUTTING SUCH A SENSOR IN A SLEEP MODE

(71) Applicant: Aktiebolaget SKF, Gothenburg (SE)

(72) Inventors: Simon Innes, Aberdeen (GB); Carl-Axel Kreku, Luleå (SE)

(73) Assignee: Aktiebolaget SKF, Gothenburg (SE)

( * ) Notice: Subject to any disclaimer, the term of this patent is extended or adjusted under 35 U.S.C. 154(b) by 353 days.

(21) Appl. No.: 18/357,722

(22) Filed: Jul. 24, 2023

(65) Prior Publication Data

US 2024/0044743 A1 Feb. 8, 2024

(30) Foreign Application Priority Data

Aug. 3, 2022 (DE) .......................... 102022208038.6

(51) Int. Cl.
*G01M 13/04* (2019.01)
(52) U.S. Cl.
CPC .................................. *G01M 13/04* (2013.01)

(58) Field of Classification Search
CPC ...................................................... G01M 13/04
USPC ......................................................... 73/865.8
See application file for complete search history.

(56) References Cited

U.S. PATENT DOCUMENTS

| 10,527,521 B2* | 1/2020 | Franchitti ........... B61L 15/0081 |
| 2014/0372498 A1* | 12/2014 | Mian ....................... H04W 4/38 |
| | | 709/201 |
| 2016/0152255 A1* | 6/2016 | Cuthbertson ....... B60B 27/0068 |
| | | 701/19 |
| 2022/0030515 A1* | 1/2022 | Berger .............. H04W 52/0206 |

* cited by examiner

*Primary Examiner* — Walter L Lindsay, Jr.
*Assistant Examiner* — Warren K Fenwick
(74) *Attorney, Agent, or Firm* — Stinson LLP

(57) ABSTRACT

The sensor (8) includes control means (12) configured to switch the sensor (8) in the sleep mode when the sensor is in an active mode and when receiving a sleep mode signal. The sensor is configured to take measurements and to send measurements to a gateway in the active mode, and is configured to stop taking measurements and disconnect from the gateway in the sleep mode.

16 Claims, 2 Drawing Sheets

SENSOR AND METHOD FOR PUTTING SUCH A SENSOR IN A SLEEP MODE

CROSS-REFERENCE TO RELATED APPLICATION

This application claims priority to German Application No. 102022208038.6, filed on Aug. 3, 2022, the entirety of which is hereby incorporated by reference.

FIELD

The present disclosure is directed to a sensor and a method for putting such a sensor in a sleep mode.

More particularly, the disclosure deals with putting a commissioned sensor in sleep mode.

BACKGROUND

Some bearings are mounted in housings.

A housing comprising a bearing may further comprise a wireless sensor to monitor the bearing.

The wireless sensor generally comprises measuring means, a transmitter and a battery to supply the measurement means and the transmitter.

In some industries, for example in mining industry, the bearing implemented in a mining machine is used for a very short time, for example less than 10 hours, before maintenance operations are done on the bearing.

The sensor is commissioned after installation on the machine.

When the mining machine is operating, the measuring means generate measurements and the transmitter transmits these measurements to a gateway.

During the maintenance, the housing is disassembled to extract the bearing.

Generally, the housing and bearing are transferred to another site to perform the maintenance operations.

During the maintenance period, the sensor housed in the housing continues to generate measurements and try to connect to a gateway to transmit these measurements for further processing, which wastes the battery power.

One known solution is to stop the sensor.

Once the housing comprising the sensor and the bearing is mounted on the machine, the sensor is started.

However, to connect the sensor to the gateway, a commissioning process needs to be performed again.

Consequently, the present disclosure intends to overcome this disadvantage.

SUMMARY

According to an aspect, a method for putting a sensor in sleep mode is proposed.

The method comprises:
sending a sleep mode signal to control means of the sensor when the sensor is in an active mode, the sensor taking measurements and sending measurements to a gateway in the active mode, and
switching the sensor in the sleep mode at the reception of the sleep mode signal by the control means of the sensor so that the sensor stops taking measurements and disconnects from the gateway.

The sensor is switched in the sleep mode without decommissioning the sensor.

Preferably, sending a sleep mode signal to the control means of the sensor comprises tagging the sensor in the sleep mode with a device.

Advantageously, the method further comprises:
sending a start signal to the control means of the sensor when the sensor is in sleep mode, and
connecting the sensor to the gateway at the reception of the start signal by the control means of the sensor, and
switching the sensor in the active mode when the sensor is connected to the gateway.

The sensor is switched in active mode without having to re-commissioning the sensor.

Preferably, sending a start signal to the control means of the sensor comprises tagging the sensor in the sleep mode with a second device.

According to another aspect, a sensor is proposed.

The sensor comprises control means configured to switch the sensor in the sleep mode when the sensor is in an active mode and when receiving a sleep mode signal, the sensor being configured to take measurements and to send measurements to a gateway in the active mode, and being configured to stop taking measurements and disconnect from the gateway in the sleep mode.

Preferably, the control means are further configured to:
connect the sensor in sleep mode to the gateway when receiving a start signal, and
switch the sensor in the active mode when the sensor is connected to the gateway.

Advantageously, the sensor further comprises communication means configured to receive the sleep mode signal and if applicable the start signal.

Preferably, the communication means are configured to communicate with a near filed communication device.

According to another aspect, a bearing device is proposed.

The bearing device comprises a housing, a bearing provided with an inner ring and with an outer ring capable of rotating concentrically relative to one another, and a sensor as defined above, the bearing and the sensor being mounted in the housing.

According to another aspect, a machine comprising a bearing device as defined above is proposed.

BRIEF DESCRIPTION OF THE DRAWINGS

Other advantages and features of the disclosure will appear on examination of the detailed description of embodiments, in no way restrictive, and the appended drawings in which.

DETAILED DESCRIPTION

Figure 1:
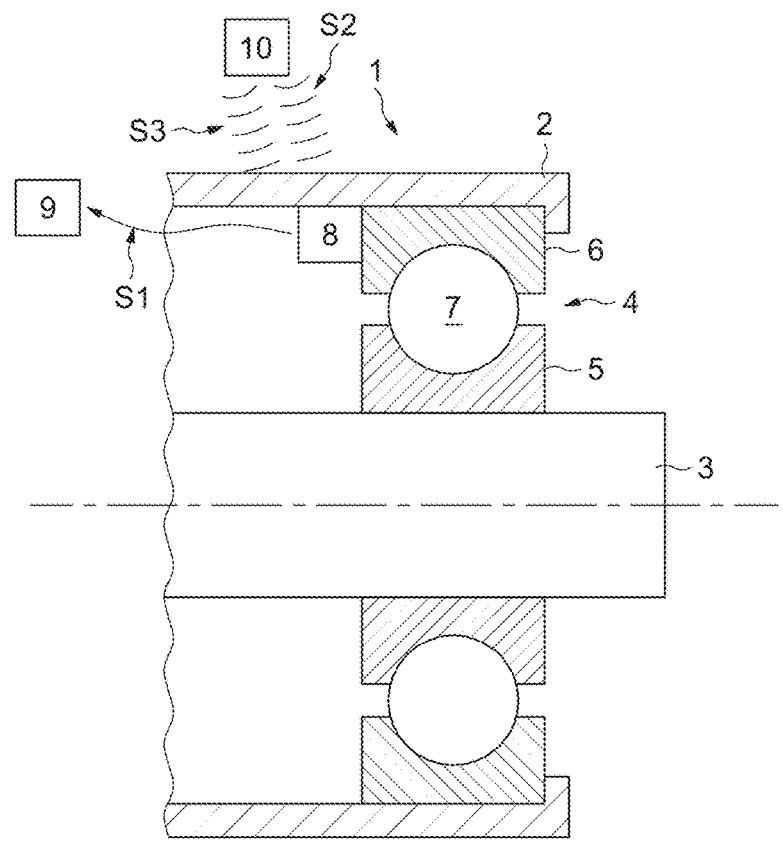
FIG. 1 illustrates schematically a machine according to the disclosure.

Reference is made to FIG. 1 which represents schematically a partial longitudinal cross section of a machine 1.

The machine 1 comprises a housing 2 and a shaft 3 supported in the housing 2 by a roller bearing 4.

The roller bearing 4 is provided with an inner ring 5 mounted on the shaft 3, and with an outer ring 6 mounted into the bore of the housing 2. The outer ring 6 radially surrounds the inner ring 5. The inner and outer rings 5, 6 rotate concentrically relative to one another.

The roller bearing 4 is further provided with a row of rolling elements 7 radially interposed between inner and outer raceways of the inner and outer rings 5, 6. In the illustrated example, the rolling elements 7 are balls. Alternatively, the roller bearing may comprise other types of rolling elements 7, for example rollers. In the illustrated example, the roller bearing comprise one row of rolling elements 7. Alternatively, the roller bearing comprise may comprise several rows of rolling elements.

A sensor 8 is mounted in the housing 2 to measure a physical parameter, for example vibrations on the outer ring 6.

The sensor 8 may be mounted on a bore of the housing 2.

In variant, the sensor 8 may be mounted on the outer ring 6 or on the outer ring 6 and on the bore of the housing 2.

In variant, the sensor 8 may measure another physical parameter, for example the temperature in the housing 2.

The sensor 8 is able to communicate with a gateway 9 to transmit the measured values to a network (not represented) for further processing.

The gateway 9 is located outside the housing 2.

In variant, the gateway 9 is inside the housing 2.

The sensor 2 is further able to communicate with a device 10 as exposed in the following.

Figure 2:
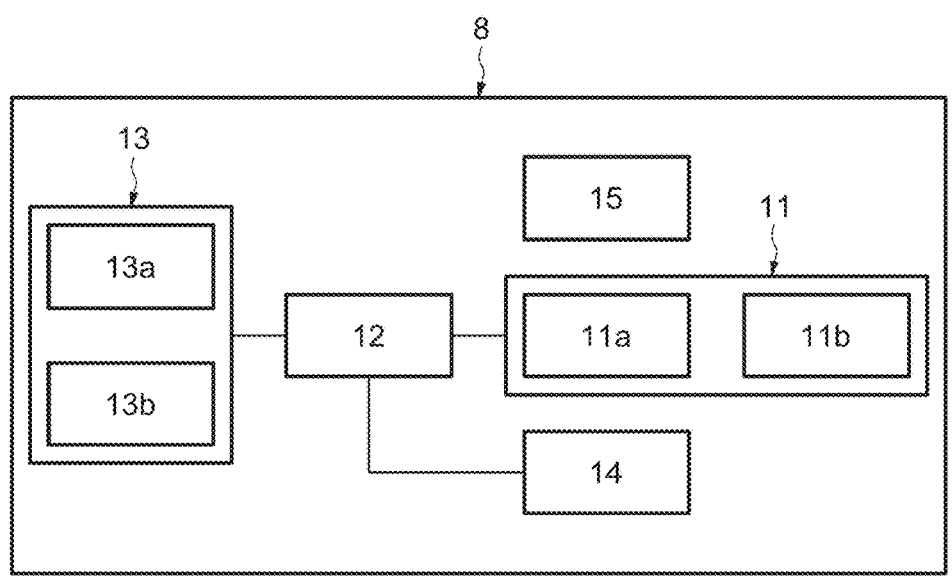
FIG. 2 illustrates schematically a sensor according to the disclosure.

FIG. 2 illustrates schematically an embodiment of the sensor 8.

The sensor 2 comprises a memory 11, control means 12, communication means 13, and measurement means 14.

The control means 12 may comprise a processing unit to implement the memory 11, the communication means 13, and the measurement means 14.

The communication means 13 comprise for example first communication means 13a communicating wirelessly with the gateway 9, and second communication means comprising for example a near field communication NFC interface 13b.

In variant, first communication means 13a and the gateway 9 are connected together with a wired connection, for example an optical fiber.

The measurement means 14 comprise for example a measurement interface measuring vibrations on the outer ring 6.

The memory 11 saves connection parameters 11a and at least one algorithm 11b, the sensor 2 being commissioned.

The algorithm 11b is implemented by the control means 11 to condition the values measured by the measurement means 14 in a standard allowing their transmission by the communication means 13a.

The connection parameters 11 a comprise the identification of the gateway 9 so that the first communication means 13a send the conditioned values to the gateway 9.

The sensor 8 may further comprise a battery 15 to supply the control means 12, the communication means 13 and the measurement means 14 with electric power.

Figure 3:
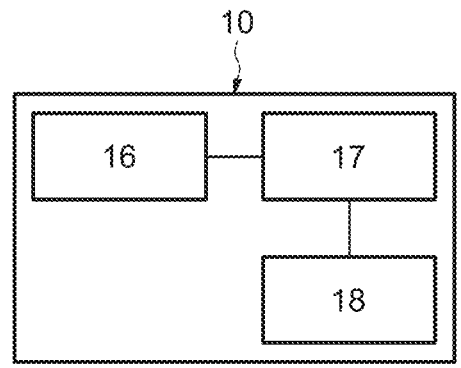
FIG. 3 illustrates schematically a device.

FIG. 3 illustrates schematically an embodiment of the device 10.

The device 10 comprises communication means 16 communicating with the second communication means 13b of the sensor 8, command means 17, and a human machine interface 18 comprising for example a touchscreen.

The communication means 16 comprise for example a near filed communication NFC interface.

The command means 17 comprise for example a processing unit implementing the communication means 16 and the human machine interface 18.

The device 10 may be an autonomous portable device, for example a mobile phone.

Figure 4:
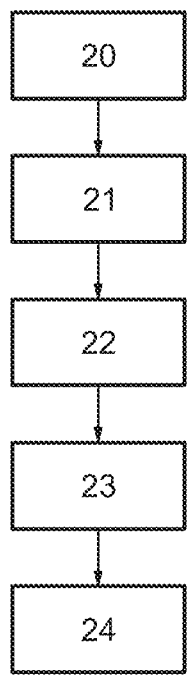
FIG. 4 illustrates schematically a method for putting a commissioning sensor in sleep mode according to the disclosure.

FIG. 4 illustrates an example of a method for putting the commissioned sensor 2 in a sleep mode.

It is assumed that the sensor 2 is in an active mode wherein the measurement means 14 measure vibration values and the first communication means 13a send a first signal S1 comprising the measured vibration values to the gateway 9.

In step 20, for example before disassembling the bearing 4 from the housing 2, the mobile phone sends a sleep mode signal S2 to the control means 12 of the sensor 8 when the sensor 8 is in an active mode.

An operator commands the device 10 with the human machine interface 18 so that the communication means 16 of the device 10 delivers the sleep mode signal S2.

As the communication means 16 of the device 10 and the second communication means 13b of the sensor 8 comprise NFC interfaces, the device 10 tags the sensor 8.

In step 21, at the reception of a sleep mode signal S2 sent by the mobile phone, the control means 12 switch the sensor 8 in a sleep mode so that the sensor 8 stops taking measurements and disconnects from the gateway 9.

The sensor 8 is switched in the sleep mode without decommissioning the sensor 8.

In step 22, the bearing 4 may be disassembled from the housing 2 for maintenance.

As the sensor 8 is in the sleep mode, the electrical power supplied by the battery of the sensor 8 is reduced preserving the duration of the battery 15 before recharging or removing the battery 15.

After maintenance of the bearing 4 and after assembling of the bearing 4 in the housing 2, in step 23, the operator commands the device 10 with the human machine interface 18 so that the communication means 16 of the device 10 delivers a start signal S3 to the control means 12 of the sensor 8 when the sensor 8 is in sleep mode.

The device 10 tags the sensor 8 to deliver the start signal.

In a variant, the start signal S3 is delivered by tagging the sensor 8 with another device.

In step 24, at the reception of the start signal S3 by the control means 12 of the sensor 8, the first communication means 13a establish a connection with the gateway 9.

After connection of the sensor 8 with the gateway 9, the control means 12 of the sensor 8 switch the sensor 8 in the active mode.

The sensor 8 is switched in active mode without having to re-commissioning the sensor 8.

The sensor 8 may be used in other applications, for example to monitor a bearing in a vehicle or in an atmosphere explosive (ATEX) industrial installation to monitor a physical parameter if the installation.

What is claimed is:

1. A method for putting a sensor in sleep mode, the method comprising:
   sending a sleep mode signal to control means of the sensor when the sensor is in an active mode, the sensor taking measurements and sending measurements to a gateway in the active mode, and
   switching the sensor in the sleep mode at the reception of the sleep mode signal by the control means of the sensor so that the sensor stops taking measurements and disconnects from the gateway.

2. The method according to claim 1, wherein sending a sleep mode signal to the control means of the sensor comprises tagging the sensor in the sleep mode with a device.

3. The method according to claim 2, further comprising
sending a start signal to the control means of the sensor
when the sensor is in sleep mode, and
connecting the sensor to the gateway at the reception of
the start signal by the control means of the sensor, and
switching the sensor in the active mode when the sensor
is connected to the gateway.

4. The method according to claim 3, wherein sending a start signal to the control means of the sensor comprises tagging the sensor in the sleep mode with a second device.

5. The method according to claim 1, further comprising
sending a start signal to the control means of the sensor
when the sensor is in sleep mode, and
connecting the sensor to the gateway at the reception of
the start signal by the control means of the sensor, and
switching the sensor in the active mode when the sensor
is connected to the gateway.

6. The method according to claim 5, wherein sending a start signal to the control means of the sensor comprises tagging the sensor in the sleep mode with a second device.

7. A sensor comprising control means configured to switch the sensor in the sleep mode when the sensor is in an active mode and when receiving a sleep mode signal, the sensor being configured to take measurements and to send measurements to a gateway in the active mode, and being configured to stop taking measurements and disconnect from the gateway in the sleep mode.

8. The sensor according to claim 7, wherein the control means are further configured to:
connect the sensor in sleep mode to the gateway when receiving a start signal, and
switch the sensor in the active mode when the sensor is connected to the gateway.

9. The sensor according to claim 8, further comprising communication means configured to receive the sleep mode signal and if applicable the start signal.

10. The sensor according to claim 9, wherein the communication means are configured to communicate with a near filed communication device.

11. A bearing device comprising a housing, a bearing provided with an inner ring and with an outer ring capable of rotating concentrically relative to one another, and a sensor according to claim 10, the bearing and the sensor being mounted in the housing.

12. A machine comprising a bearing device according to claim 11.

13. The sensor according to claim 7, further comprising communication means configured to receive the sleep mode signal and if applicable the start signal.

14. The sensor according to claim 7, wherein the communication means are configured to communicate with a near filed communication device.

15. A bearing device comprising a housing, a bearing provided with an inner ring and with an outer ring capable of rotating concentrically relative to one another, and a sensor according to claim 7, the bearing and the sensor being mounted in the housing.

16. A machine comprising a bearing device according to claim 15.

* * * * *